United States Patent [19]

Shii et al.

[11] Patent Number: 5,006,292
[45] Date of Patent: Apr. 9, 1991

[54] MANUFACTURING UNIAXIALLY DRAWN ORIENTED POLYOLEFIN FILM FOR ELECTRIC INSULATION

[75] Inventors: Hikaru Shii; Fumio Sugimoto, both of Tokyo, Japan

[73] Assignee: The Furukawa Electric Co., Ltd., Tokyo, Japan

[21] Appl. No.: 641,411

[22] Filed: Aug. 16, 1984

Related U.S. Application Data

[63] Continuation of Ser. No. 286,029, Jul. 22, 1981, abandoned.

[30] Foreign Application Priority Data

Jul. 25, 1980 [JP] Japan ................................. 55-101983

[51] Int. Cl.$^5$ .............................................. B29C 47/40
[52] U.S. Cl. ...................... 264/127; 264/143; 264/210.6; 264/211.21; 264/211.23; 264/280; 264/284; 264/288.8; 264/DIG. 47
[58] Field of Search ............... 264/143, 210.6, 211, 264/154, DIG. 47, 122, 127, 280, 284, 211.21, 288.8, 211.23; 525/199

[56] References Cited

U.S. PATENT DOCUMENTS

| | | | |
|---|---|---|---|
| 2,945,827 | 7/1960 | Henning | 525/199 |
| 3,005,795 | 10/1961 | Busse et al. | 525/199 |
| 3,125,547 | 3/1964 | Blatz | 525/199 |
| 3,231,642 | 1/1966 | Goldman et al. | 264/209.5 |
| 3,243,486 | 3/1966 | Pilaro | 264/209.5 |
| 3,246,061 | 9/1966 | Blatz | 264/209.5 |
| 3,334,157 | 8/1967 | Larsen | 525/199 |
| 3,679,788 | 7/1972 | Kiyono et al. | 264/211 |
| 3,894,904 | 7/1975 | Cook | 156/229 |
| 4,024,213 | 5/1977 | Honda et al. | 264/154 |
| 4,350,655 | 9/1982 | Hoge | 264/210.6 |

FOREIGN PATENT DOCUMENTS

| | | | |
|---|---|---|---|
| 655293 | 1/1963 | Canada | 525/199 |
| 2110327 | 6/1972 | France . | |
| 45-30574 | 10/1970 | Japan | 525/199 |
| 1432419 | 4/1976 | United Kingdom . | |

*Primary Examiner*—Jeffery Thurlow
*Attorney, Agent, or Firm*—Frishauf, Holtz, Goodman & Woodward

[57] ABSTRACT

A uniaxially drawn oriented polyolefin film for cable insulation, has a thickness of 80 to 250μ and is composed of a crystalline polyolefin having a melt index of 10 or more and 0.5 to 20 phr of unsintered polytetrafluoroethylene, wherein the added unsintered polytetrafluoroethylene is in the form of microfibrous particles uniformly dispersed in the crystalline polyolefin as a matrix so as to be parallel to the orientation axis of the polyolefin; an apparent MI value of the film is ¼ to 1/10 of the MI value of the crystalline polyolefin used; the tensile Young's modulus of the film in the direction of the orientation axis is $2 \times 10^4$ kg/cm$^2$ or more; and the change in the thickness of the film in dodecylbenzene at 100° C. is 10% or less. A method for manufacturing this film is also provided.

11 Claims, No Drawings

MANUFACTURING UNIAXIALLY DRAWN ORIENTED POLYOLEFIN FILM FOR ELECTRIC INSULATION

This application is a continuation of application Ser. No. 286,029, filed July 22, 1981 now abandoned.

The present invention relates to a low loss polyolefin film suitable for ultra high voltage oil-filled cables (UHV OF cable) and to a manufacturing method therefor. More particularly, the present invention relates to a polyolefin film for electric insulation consisting wholly of low dielectric loss factor plastics, and to a manufacturing method therefor.

Conventionally, kraft paper sheets have almost exclusively been used for cable insulation for oil-filled cables (OF cable) when the transmission capacity of the cable was not required to be very large. However, the recent increase in the demand for electric power in urban areas requires ultra high voltage large capacity transmission to be made by a single transmission line. A problem in such a trend is that insulation thickness cannot be increased indefinitely even when the transmission voltage is raised because the overall diameter of a cable is limited by the size of the conduit or the like in which it is laid. Thus, an insulation material having a high dielectric breakdown strength per unit thickness is required. Especially considering the fact that the building of a power station of large capacity in urban areas has become difficult, long-distance transmission from remote places to urban centers becomes necessary. For such a long distance high capacity transmission, it is necessary to suppress the dielectric loss of the insulator and heat generation of the cables. In order to achieve this, it is advantageous to use the so-called low-loss material which has small $\epsilon \cdot \tan \delta$ value. Furthermore since the insulation layer of OF cable is immersed in insulation oils such as mineral oil, paraffin oil, alkylbenzene oil, and silicone oil, swelling and dissolution of the polymeric insulation materials at high temperatures, not to mention room temperature, must be avoided as much as possible. Since alkylbenzene oils such as DDB (dodecylbenzene oil) are mainly used in Japan, a low loss material or a nonpolar material having oil resistance is required. Another important property of the insulating material is high tensile Young's modulus. High modulus nonpolar materials are required for preventing buckling due to relative sliding between insulation layers when winding the cable on a drum or when bending it at the portion which extends vertically from the conduit. Plastics generally have a lower Young's modulus than cellulose paper sheets. Therefore, improvements in this problem have been introduced mainly by using materials having high glass transition temperatures or polar materials having benzene rings in the main chains. However, unsatisfactory results as to low-loss characteristic have been obtained, except in some specific cases. Cellulose papers, compared with plastic materials, has stable and excellent dielectric strength, especially when oil-impregnated. However, when plastic materials are used, especially as formed into a laminated body of many layers, an abrupt decrease in the breakdown voltage is frequently confirmed as compared with a single sheet of the same material.

In summary, considering the properties to be possessed by the insulation paper sheets to be used for OF cables, a novel material is required, especially in view of the limits of properties, $\epsilon = 3.3$ and $\tan \delta = 0.15\%$, of the kraft paper sheets, which are inherent values of the material.

For those reasons mentioned above, development of a totally new material is desired which has excellent dielectric breakdown strength, oil resistance and Young's modulus as well as the low dielectric loss characteristic of the starting plastic materials.

Many trials have been made to solve this problem. For example, it has been proposed according to the prior art method to extrude into sheets material (e.g., polyethylene terephthalate, polycarbonate) which is less compatible with insulation oils and has higher dielectric loss as a substitute for the kraft paper sheets. Although those materials may offer no problem of oil resistance, it has high dielectric loss, which causes considerable heat generation from the cable, and in addition, shows ineffective thermal conduction which is inherent to the plastic materials, providing an unsuitable material for an ultra high voltage oil-filled cable. With such a material, for the purpose of improving the bending ability of the cable, biaxial stretching is frequently performed for the purpose. Although this is effective in raising the mechanical strength and the tear strength, no successful processing to obtain a material of high modulus suitable for insulation paper has been reported yet.

Practically a polypropylene sheet of low dielectric loss is formed into a biaxially stretched film and the properties of the films are examined, having confirmed that limits of required oil resistance and Young's modulus are not exceeded.

Another approach proposed was non-woven type fabric which are obtained by extruding a molten polymer from a nozzle at a high speed and formed into a planar integral sheet. Since the insulation paper sheets thus obtained were generally poor in dielectric breakdown strength, strong calendering is adopted for improving the dielectric breakdown strength and air impermeability. However, they proved to be unsuitable for plastic insulation paper sheets from the lack of the stiffness or modulus and oil resistance. Still other types of plastic paper sheets have been proposed such as composite paper of plastic fiber and a pulp or combined paper sheets of fibrid and plastic fiber which do not adopt the processing method of such a non-woven type plastic sheet, instead of the conventional process for the kraft paper making. However, no case has been reported according to which such plastic paper sheets have been put to practical use.

The present inventors have carefully studied insulation paper sheets for OF cables taking the problems as described above into consideration. As a result of the studies, the present inventors have found that a new material having excellent properties suitable for ultra high voltage oil-filled cables can be obtained by drawing under specific conditions extruded sheeting of a composition mainly of polyolefin, typical loss-material, and of polytetrafluoroethylene.

Thus, the present invention relates to a uniaxially drawn oriented polyolefin film for cable insulation, having a thickness of 80 to 250μ and composed of a crystalline polyolefin having a melt index of 10 or more and 0.5 to 20 parts per hundred parts of polyolefin resin (phr) of unsintered polytetrafluoroethylene, wherein the added unsintered polytetrafluoroethylene is in the form of microfibrous particles uniformly dispersed in the crystalline polyolefin matrix parallel to the orientation axis of the matrix; an apparent MI value of the film is ¼ to 1/10 of the MI value of the crystalline polyolefin used; the tensile Young's modulus of the film in the direction of the orientation axis is $2 \times 10^4$ kg/cm$^2$ or more; and the change in the thickness of the drawn film in dodecylbenzene at 100° C. is 10% or less. The present invention also relates to a method for manufacturing a uniaxially drawn oriented polyolefin film for cable insulation characterized by dispersing 0.5 to 20 phr of finely-divided unsintered polytetrafluoroethylene in a finely-powdered crystalline polyolefin having a melt flow index so high that it cannot be formed into sheets, that is, an MI value of 10 or more in such a manner that the particles do not substantially stick together to form a coherent mass; extruding the resultant mixture with an extruder capable of generating high shearing stress; forming the extrudate into a sheet; and reducing the thickness of the resultant sheet to $\frac{1}{2}$ to 1/10 of the original thickness at a temperature range of 50° to 20° C. lower than the melting point of the polyolefin used, to provide a film 80 to 250μ in thickness.

A cable insulation sheet obtained by the method of the present invention is of specific functional material, excellent in dielectric loss, oil resistance, dielectric breakdown strength, and Young's modulus. Although it has been admitted in general that 500 kV transmission OF cables are the limit to which conventional kraft paper sheets may be used, the material according to the method of the present invention may be used for OF cables without such the limits; this considerably lifts the conventional technical level. For example, it is possible to manufacture 750 kV class or 1,000 kV class OF cables. Furthermore, by adopting the novel material of the method of the present invention for the conventional OF cables of class 500 kV or less, the transmission capacity may at a stroke be increased with reduction in the amount of heat generated, and the equipment cost may be saved by the reduction in the cable accessory equipment such as reactors. Thus, marked effects obtained through the use of the novel material of the present invention are expected.

Describing the method of the present invention in more detail, 0.5 to 20 phr of unsintered polytetrafluoroethylene in finely divided powder form is added to a crystalline polyolefin in powder form having an MI value of 10 or more in such a manner that the powder particles do not substantially stick together to form a coherent mass. The compound is extruded by a machine capable of generating a high shearing stress, such as a twin-screw type extruder, and is processed to obtain a sheet. The resultant sheet is stretched or rolled to a thickness of $\frac{1}{2}$ to 1/10 of the original thickness at a temperature range of 50° to 20° C. lower than the melting point of the polyolefin used. It can be observed that the polytetrafluoroethylene powdery particles are changed into microfibrous particles which are oriented parallel to the orientation axis of the matrix. The characteristics of the obtained material are: a film of 80 to 250μ thick having a tensile Young's modulus in machine direction of $2 \times 10^4$ kg/cm$^2$ or more may be obtained, and the increase in thickness in dodecylbenzene at 100° C. may be estimated at 10% or less.

The crystalline polyolefin to be used according to the present invention may include linear hydrocarbon polyolefins such as low density polyethylene, high density polyethylene, isotactic polypropylene, poly-4-methylpentene-1, polybutene, polyisobutene and copolymeric compositions including at least two of these.

The polyolefin material is conveniently in a form of large surface area, such as granules, flakes, fibers, and powder; and is preferably in the form of powder of 50 to 400-mesh.

It is to be noted that the polyolefin material to be used herein is not of sheet forming grade normally used since it requires an MI value of 10 or higher. Desired polyolefin products are normally formed by the melt extrusion method and the polyolefins used have MI values suitable for the respective forming methods adopted. In the case of extrusion, the resin in the molten state must take the form of a sheet immediately after leaving the die, so a polyolefin of a small melt flow index (10 or lower in most cases) is used. Since the crystallinity of a material having such MI values is normally low, the high oil resistance and high Young's modulus which are the objects of the present invention can not be expected. However, the sort of the polyolefins used herein are high crystalline polymers with an MI value of 10 or higher, preferably 15 or higher. Since this type of resin has an extremely small melt viscosity, a sheet may not be obtained from such a resin by extrusion. The reason why such a resin is used according to the present invention is that this type of material is excellent in dimensional stability in heated insulation oils such as DDB when the material is used for the blended composition to be described hereinafter.

The unsintered polytetrafluoroethylene resin to be used according to the present invention is in the form of powder, flakes, or aqueous colloidal dispersion. Most preferably it is used in the form of aqueous colloidal dispersion or emulsion. This is obtained by concentrating the colloid obtained by emulsion polymerization as the general polymerization method of polytetrafluoroethylene, and stabilizing it with a surfactant. For uniformly dispersing such emulsion or the like in the polyolefin having the MI value as described above, a device such as a ribbon blender, a V-blender, a Henschel mixer or the like may be adopted which is normally used for uniformly dispersing filling materials such as additives, fillers in pellets or powder in the plastic industry. The processing temperature for blending the resins according to the method of the present invention is preferably not too high. Generally, a temperature range of 0° to 60° C., preferably 5° to 40° C., is adopted. This restricted temperature range is related with the phase transition of polytetrafluoroethylene near the room temperature and with dispersion during blending.

The amount of polytetrafluoroethylene (PTFE) for mixing is 0.5 to 20 parts by weight, based on 100 parts by weight of polyolefin (Phr), and preferably 1 to 10 Phr. For uniformly dispersing PTFE at a mixing ratio as small as this, it is more desirable to prepare a masterbatch of high concentration of PTFE and to dilute it with a desired polyolefin. Dilution may be performed with a machine such as a blender or a mixer as described above. When PTFE aqueous colloidal dispersion is used, the base composition such as a polyolefin powder or pellets is flowed by a blender or the like while a dispersion is added there to prepare a uniform wet powder which is then placed in a heating vacuum chamber held at a temperature of 80° C. or lower for the removal of water. A masterbatch composed of a polyolefin and PTFE is thus obtained according to the above-mentioned process. This masterbatch is diluted with pure polyolefin powder according to the method described above to provide a composition of desired mixing ratio.

According to the present invention, the PTFE particles are changed into microfibrous material by a machine which is able to generate a high shearing stress to the melt, such as twin-screw type extruder. According to this process, PTFE dispersed in the molten polyolefin is deformed by the shearing stress caused by the kneading of the polyolefin matrix, and the particles are formed into fibrous material. It is important that the mixture is kneaded and processed at a temperature not higher than the heat distortion temperature of PTFE and not lower than the melting point of the polyolefin. Since unsintered PTFE herein is used, the fibrous PTFE does not preferably shrink if treated at an excessively high temperature (e.g., 300° C. or higher). When PTFE is used in combination with an olefin material such as polyethylene and polypropylene, virtually no problem occurs since the melting point of polyolefin is sufficiently far apart from the melting temperature of PTFE.

An extruder of high shearing stress is a screw type extruder having an L/D value of 15 or more, preferably 20 or more. The extruder is more desirably of twin-screw type rather than of single-screw type. Effective kneading is believed to be obtainable with the twin-screw type extruder wherein the direction of rotation of the two screws are opposite. More preferably, to improve the mixing efficiency of the molten resin material, it is effective to arrange linear grooves of special spiral contour at the front end or at the intermediate portion of the screws or to arrange a special grooved portion for generating turbulent flow in the resin material at the same position.

In the kneaded material which is of the composition as described above, the fibrous PTFE is uniformly dispersed in the matrix of the polyolefin and the orientation of the fibrous material is at random. The appearance of the dispersed PTFE may be easily observed with a polarizing microscope. In this case, fibrous PTFE may clearly be observed by melting the polyolefin matrix on a heating stage. The diameter of the fibrous material is in most cases 5μ or less, and its length cannot be clearly determined. This is attributed to the fact that the fibrous material is connected in a network manner, the length of each strand is not determinate.

Melt index (MI) of the compound prepared by such a specific blending method is considerably reduced, depending upon the amount of PTFE added. For example, the addition of 3 to 5 phr of PTFE results in a decrease of ¼ to 1/10 of the MI value of the matrix polyolefin used. This makes the polyolefin having high MI values and a high crystallinity which hitherto could not be extruded into sheets may now be easily formed into sheets.

According to the method of forming the sheets by the present invention, a forming die such as a T-die is mounted to a twin-screw extruder, and the extruded sheet is taken up by quench rolls. The forming method is not, however, limited to this. For example, the strand extruded from a twin-screw extruder may be passed through a strand cutter to be pelletized. The pellets thus obtained may then be passed through a sheet die of a normal single-screw extruder to be formed into a sheet. The thickness of the sheet obtained according to this method may be kept within a range of 0.05 to 3 mm, and preferably 0.1 to 1.5 mm. As has already been described, it is particularly important that cable insulation material of low dielectric loss sheets for the cable insulation also possesses oil resistance. Thus, it is of considerable significance to use a high crystalline material as a starting material although it shows a poor sheet forming ability.

Oil resistance of the polyolefin is related not only to the high crystallinity but also to a complicated problem of orientation of crystallites and chain conformation between the crystallites, or amorphous density.

With reference to this point the following supplementary explanations are given.

Base resin of larger MI values has higher crystallinity and density and swells less. Those materials, however, cannot be used for insulation of OF cables, because of their inability to form sheeting and large amount of swelling in insulation oil.

In the method described in USP 3,005,795, polyolefin of high MI can be extruded in a sheet form when a small amount of PTFE is mixed in it.

This invention is characterized in that low molecular weight polyolefins or a polyolefins of a particular large MI values are extruded and formed into drawn films by drawing or rolling.

One of the distinctive discoveries used in this invention is that the extruded sheet obtained by the above-mentioned method can be drawn into a film under a heated condition.

In this case, since unsintered PTFE surrounded by polyolefin matrix has an excellent forming ability, no non-uniform stretching or hole-formation is observed in the drawn film as is the case with composite material sheet composed of polyolefin and glass fibers or the like.

Particularly highly oriented films obtained in this invention acquires nobel physical properties such as unusually high oil-resistance, and Young's modulus suitable for an OF cable insulation. Fortunately PTFE shows low dielectric loss and excellent oil resistance.

In connection with the present invention, studying the swelling of uniaxially drawn materials the present inventors elucidated the following experimental fact:

However, this does not restrict the present invention.

A 5~10% increase in the "long period" of uniaxial oriented film in a swollen state is observed. Since there is no swelling of crystalline part, amorphous part between crystallite swells along the orientation axis.

When observed macroscopically on the otherhand, oriented films increase the length along the machine direction.

Swelling of uniaxially highly oriented film makes a little increase in film thickness but a remarkable increase in film length. The decisive factor governing the swelling of the drawn materials is the density of the amorphous part. With the background of the above-mentioned microstructure of oriented materials, the present inventors have adopted as the final step of the forming method of the present invention, the stretching process for reducing the thickness of the extruded sheet by uniaxial rolling, or by drawing, or by both. This treating method may include drawing that adopts multi-stage rolls. The change in the thickness of the sheet is 1/10 to 1/2, preferably ⅛ to 1/5, of the original thickness of the sheet. The drawdown temperature at which the extruded sheet is deformed is extremely important and is generally within a temperature range from 50° to 20° C. lower than the melting point of the polyolefin. More particularly, it is in the vicinity of the temperature at which viscoelastic dispersion from crystalline region is observed. It is thus near 120° to 140° C. for polypropylene and near 75° to 100° C. for polyethylene. This temperature range may easily be selected by indirectly measuring the temperature dispersion of the dynamic loss in the measurement of dynamic viscoelasticity, as is well known.

By the rolling or drawing treatment for the reduction of the thickness of the sheet described above, the tensile Young's modulus of the resultant material generally exceeds $2 \times 10^4$ kg/cm$^2$. With the obtained material, the swelling in hot dodecylbenzene (DDB) which is usually used for cable insulation is extremely reduced. For example, when the material is immersed in DDB at 100° C. for enough long period of time, the saturated increase in thickness of the material is less than 10% in most cases. This indicates that the polyolefin used is highly crystalline, and the oriented effect of the microstructure has also deep significance.

For cable insulation use of the final product obtained according to the method of the present invention, the drawn sheet generally has a final thickness of 80 to 250$\mu$, preferably 100 to 200$\mu$. By the treatment such as rolling or drawing or the like, the fibrous PTFE dispersed in the matrix of the polyolefin is oriented parallel to the machine direction. Even when multi-component phase of different refractive indices are present, the uniformly dispersed fibrous PTFE in the drawn film may be clearly detected by a phase difference microscope. Therefore, the fibrous PTFE dispersed in the oriented polyolefin may be easily observed without any disturbance. In this case, though the fibrous PTFE may be expected to be a highly oriented material which has a tendency to split, longitudinally the splitting may be kept at a lower level since the fibrous PTFE is connected in a network form as has been described. The reduction in the splitting tendency is important since it brings desirable influence on the workability for drawing and precise slitting to a fixed width. For the further reduction of the splitting, drawn sheet after rolling may be passed between embossing rolls. The temperature of the embossing rolls may be lower than the temperature of the rolling and drawing, preferably between 70° and 110° C. This embossing processing is preferable for another reason: channels for oil flow between the sheets may be maintained by embossed hollows when the cable insulation sheets are used in the insulation oil.

In summary, polymer material obtained according to the method of the present invention, especially when applied to OF cable insulation, exhibits excellent characteristics. Especially, the attained low dielectric loss property which exceeds the technical limit of the kraft paper sheets provides marked progress of UHV power transmission.

The present invention is further described by the following examples.

EXAMPLES 1 TO 3 AND COMPARATIVE EXAMPLE 1

Into a powder (120 mesh) of an isotactic polypropylene (hereinafter referred to as iso-PP) having a melt index of 20, was dropped an aqueous colloidal dispersion (mean particle size, 0.3$\mu$; polymer content 60%; specific gravity of the dispersion, 1.5) of unsintered polytetrafluoroethylene (hereinafter referred to as PTFE) while the powder was mixed in a blender. Upon this operation, a wet powder uniformly containing 20 parts of PTFE based on 100 parts of iso-PP was obtained. The mixture was placed and dried in vacuum at 90° C. for 12 hours. To reduce the concentration of PTFE to 3 phr, 20 phr of PTFE-containing iso-PP compound were mixed with fresh iso-PP at room temperature for 5 minutes by a Henschel mixer (760 r.p.m.). This blended powder compound was extruded from a strand die at 200° C. of a twin-screw extruder (L/D=23; screw diameter, 30 mm) for pelletization. The pellets were extruded into three sort of sheets of different thickness and 100 cm width from a T-die of a 90 mm extruder. These sheets were drawn down into oriented sheets of 150$\mu$ in thickness by varying the drawing ratio by varying the winding speed of the sheets at a drawing temperature of 135° C. while passing them along the multi-stage rolls. Substantially no change in size in the direction of width was observed, while the change in thickness corresponded to the change in the drawing ratio. The drawn sheets were immersed in DDB oil (dodecylbenzene oil) at 100° C. for 6 hours, and the increase in thickness by swelling was observed. Table 1 shows, in addition to swelling, dielectric breakdown strength (AC 50 CPS, room temperature), tensile Young's modulus, and $\epsilon \cdot \tan \delta$ (AC 50 CPS). As a comparative example, the characteristics of a biaxially stretched PP film which was stretched 6 times in both machine direction and transverse directions are shown.

TABLE 1

| Example | Sheet thickness (mm) | Drawing rate (rate of change in thickness) | Young's modulus (kg/cm$^2$) | Increase in thickness in DDB oil (%) | $\epsilon \tan \delta$ (%) | Dielectric breakdown strength (kV/mm) |
|---|---|---|---|---|---|---|
| 1 | 0.6 | 4 (0.25) | $4.20 \times 10^4$ | 3.5 | 0.02 | 120 |
| 2 | 0.9 | 6 (0.166) | $4.3 \times 10^4$ | 3 | 0.02 | 180 |
| 3 | 1.2 | 8 (0.125) | $4.5 \times 10^4$ | 2 | 0.03 | 220 |
| Comparative Example 1 | 1.2 | 6 × 6 | $2.1 \times 10^4$ | 15 | 0.02 | 60 |

EXAMPLES 4 TO 6 AND COMPARATIVE EXAMPLES 2 TO 4

Drawn sheets were obtained in substantially the same manner as in Examples 1 to 3, except that a high density polyethylene (MI=13) was used as the base resin of the compound and that the amount of the PTFE added was varied. The PTFE resin used was similarly in the form of aqueous colloidal dispersion. In Examples 4 to 6, the amount of the PTFE added was varied within the range of 1 to 10 phr. The sizes of the extruded sheets and drawn sheets were the same as in Examples 1 to 3.

Table 2 shows the respective characteristics of the obtained sheets and, for comparison, those of an undrawn sheet containing 5 parts by weight of the PTFE and two hot-pressed sheets containing no PTFE (pressed at 180° C. to 150$\mu$ thickness), one not drawn and the other drawn 7 times longer.

Due to addition of PTFE, the Young's modulus and oil resistance were improved, and these characteristics were further improved by drawing.

TABLE 2

| Example | Parts of PTFE | Drawing temperature (°C.) | Drawing ratio | Young's modulus (kg/cm²) | Increase in thickness (%) | Dielectric breakdown strength (kV/mm) |
| --- | --- | --- | --- | --- | --- | --- |
| 4 | 1 | 80 | 4.6 | 4.1 × 10⁴ | 3 | 102 |
| 5 | 3 | 90 | 5.5 | 4.8 × 10⁴ | 2 | 109 |
| 6 | 5 | 100 | 7.0 | 5.1 × 10⁴ | <1 | 120 |
| Comparative Example 2 | 5 | — | 1 | 2.7 × 10⁴ | 8 | 80 |
| Comparative Example 3 | 0 | — | 1 | 1.5 × 10⁴ | 12 | 80 |
| Comparative Example 4 | 0 | 100 | 7 | 3.2 × 10⁴ | 5 | 100 |

EXAMPLE 7

Drawn films of iso-PP/PTFE blend compositions were obtained in a manner similar to that of Example 3. The reduced longitudinal splitting by embossing was examined for the obtained drawn films. Table 3 shows the embossing conditions, the apparent thickness of the embossed films, elongation in the transverse direction, and splitting properties of the films. The characteristics of the drawn film which was not subjected to embossing are also shown in the table.

TABLE 3

| | Embossing conditions | | Film characteristics after embossing | | |
| --- | --- | --- | --- | --- | --- |
| Sample No. | Embossing temperature °C. | Space between embossing rolls (μ) | Apparent thickness of the film (μ) | Elongation in transverse direction (%) | Splitting |
| 1 | 80 | 120 | 158 | 5.7 | Medium |
| 2 | 80 | 100 | 167 | 6.6 | Low |
| 3 | 80 | 70 | 177 | 8.1 | Low |
| 4 | 138 | 100 | 175 | 6.6 | Low |
| Original product | — | — | 150 | 2.8 | High |

As may be apparent from Table 3, the splitting of the resultant films was diminished when the embossing temperature was less than the drawing temperature of the films, that is, about 80° C., and when the pressure exerted on the films during embossing is higher, that is, when the operated roll gaps smaller.

EXAMPLE 8

To poly-4-methylpentene-1 having a melt index (MI) of 26, added unsintered polytetrafluoroethylene in powder form in a ratio shown in Table 4; and the mixture was pelletized. The mixed compound was extruded into a T-die sheet of 200 mm in width, by a 40 mm twin-screw extruder (L/D=27) having different rotating directions, at a die temperature of 280° C. and an extruding pressure of 130 kg/cm². The extruded sheets were guided to cooling rolls of 50 mm in diameter to obtain semitransparent sheets 180 mm in width and 0.8 mm in thickness. The sheets were then passed between heated rolls held at a temperature shown in Table 4 to provide oriented sheets of various rolling rates.

Oil resistance, dielectric breakdown strength, and tensile Young's modulus of the obtained sheets were measured. The results are shown in Table. 4.

TABLE 4

| Amount of PTFE added (phr) | Rolling temperature (°C.) | Oil resistance (%) [Thickness Increase] | Young's modulus (kg/cm²) | Dielectric breakdown strength (kV/mm) |
| --- | --- | --- | --- | --- |
| 1 | 200 | 5.2 | 4.2 × 10⁴ | 120 |
| 3 | 210 | 4.3 | 4.4 × 10⁴ | 130 |
| 5 | 215 | 3.5 | 4.8 × 10⁴ | 132 |

EXAMPLE 9 AND COMPARATIVE EXAMPLE 5

Compositions of isotactic PP powder (100 to 150 mesh) having different MI values with different amounts of polytetrafluoroethylene added thereto were prepared, and the apparent MI values of the obtained compositions were measured. The respective compositions were formed into strands by a twin-screw extruder, and the strands were pelletized by a strand cutter. Thereafter, the pellets were extruded by a 75 mm single-screw extruder having a T-die, into sheets 1.2 mm in thickness.

The apparent MI values were measured according to the known method (JIS method: the amount of the polymer flowed for 10 minutes was measured in grams when the polymer was flowed from a nozzle 2.095 mm in diameter and 8 mm in length at 230° C. with a load of 2.16 kg). For evaluation of the formability into sheets, the extruduate of the sheets from the T-die was observed. Table 5 shows the obtained results.

The sheets of the compositions obtained in this example were drawn 8 times longer at a drawing temperature of 135° C., and the Young's modulus of these drawn films was also obtained. It can be seen from these results that when the MI value of the base resin is not high (e.g., MI value 8 in comparative example), the apparent MI value becomes too small and the formability into sheets is lost. Thus, the objective formed product is not obtained.

TABLE 5

| | MI value of iso-PP | Amount of PTFE added (phr) | Apparent value of MI | Sheet formability (molten condition) | Young's modulus (kg/cm$^2$) | Drawing ratio |
|---|---|---|---|---|---|---|
| Example 9 | 50 | 1 | 4.1 | Good | 43,000 | 8 |
| | | 3 | 3.5 | | 38,000 | 8 |
| | | 5 | 3.2 | | 35,000 | 8 |
| | 25 | 1 | 3.5 | Good | 40,500 | 8 |
| | | 3 | 3.2 | | 37,000 | 8 |
| | | 5 | 3.1 | | 33,000 | 8 |
| Comparative Example 5 | 8 | 1 | 1.5 | Poor | No film obtained | — |
| | | 3 | 0.9 | | | — |
| | | 5 | 0.08 | | | — |

As may be apparent from the above examples, the cable insulation oriented polyolefin films of the present invention have excellent electrical characteristics, oil resistance, and mechanical properties, so their industrial application is promising.

What we claim is:

1. A method of manufacturing a uniaxially drawn oriented polyolefin film for cable insulation which has the tensile Young's modulus in the direction of the orientation axis of at least $2 \times 10^4$ kg/cm$^2$, and the change in the thickness in dodecylbenzene at 100° C. of not more than 10%, said method comprising forming an extruding mixture by dispersing in a finely-divided powdered crystalline polyolefin having a melt index of at least 10, 0.5 to 20 parts per hundred parts of said crystalline polyolefin of finely-divided unsintered polytetrafluoroethylene so that the particles do not substantially stick together to form a coherent mass;

extruding the mixture with an extruder capable of exerting high shearing stress at a temperature not higher than the heat distortion temperature of said unsintered polytetrafluoroethylene and not lower than the melting point of said crystalline polyolefin to thereby form an extrudate and forming the extrudate into a sheet by a sheet forming device having a forming die on a twin-screw type extruder with an L/D of at least 15;

solidifying the extruded sheet by cooling; and reducing the thickness of the solidified cooled sheet to ½ to 1/10 of the thickness of the solidified cooled sheet by drawing or rolling at a temperature of from 50° to 20° C. lower than the melting point of the crystalline polyolefin thereby to provide said uniaxially drawn oriented film having a thickness of 80 to 250 microns.

2. The method according to claim 1, wherein the crystalline polyolefin is selected from the group consisting of low density polyethylene, high density polyethylene, isotactic polypropylene, poly-4-methylpentene-1, polybutene, polyisobutene and copolymers thereof.

3. The method according to claim 2, wherein the crystalline polyolefin is isotactic polypropylene.

4. The method according to claim 2, wherein the crystalline polyolefin is high density polyethylene.

5. The method according to claim 1, wherein forming the extruding mixture comprises uniformly mixing an aqueous colloidal dispersion of said finely-divided unsintered polytetrafluoroethylene with the finely-divided powdered crystalline polyolefin and thereafter drying the mixture so that the finely-divided unsintered polytetrafluoroethylene will be dispersed in the finely-divided powdered crystalline polyolefin substantially without forming a coherent mass.

6. The method according to claim 1, further comprising embossing the resulting uniaxially drawn oriented polyolefin film at a temperature lower than the temperature employed in the step of reducing the thickness of the solidified cooled sheet.

7. The method according to claim 1, further comprising forming the mixture of the crystalline polyolefin with the unsintered polytetrafluoroethylene dispersed therein into strands by a twin-screw type extruder with an L/D of at least 15, pelletizing the strands by a strand cutter into pellets and forming the pellets into sheets by a single-screw extruder.

8. The method according to claim 1, wherein the amount of polytetrafluoroethylene is 1 to 10 parts per hundred parts of the crystalline polyolefin.

9. The method of claim 1, wherein the screws of said extruder rotate in opposite directions.

10. The method according to claim 1, wherein forming the extruding mixture comprises uniformly mixing an aqueous colloidal dispersion of said finely-divided unsintered polytetrafluoroethylene with the finely-divided powdered crystalline polyolefin and thereafter drying the mixture so that the finely-divided unsintered polytetrafluoroethylene will be dispersed in the finely-divided powdered crystalline polyolefin substantially without forming a coherent mass.

11. The method according to claim 1, wherein the step of dispersing the unsintered polytetrafluoroethylene in the crystalline polyolefin comprises dispersing 3 to 5 phr of polytetrafluoroethylene to reduce the melt index to ½ to 1/10 of the melt index of the crystalline polyolefin.

* * * * *